United States Patent
Kageyama et al.

(10) Patent No.: US 10,591,020 B2
(45) Date of Patent: Mar. 17, 2020

(54) TRANSMISSION BELT AND BELT-SPEED-CHANGE DEVICE

(71) Applicant: Mitsuboshi Belting Ltd., Nagata-ku, Kobe-shi, Hyogo (JP)

(72) Inventors: Mikio Kageyama, Hyogo (JP); Susumu Takaba, Hyogo (JP); Hisato Ishiguro, Hyogo (JP); Hideyuki Matsumoto, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 185 days.

(21) Appl. No.: 14/780,807

(22) PCT Filed: Mar. 27, 2014

(86) PCT No.: PCT/JP2014/059051
§ 371 (c)(1),
(2) Date: Sep. 28, 2015

(87) PCT Pub. No.: WO2014/157594
PCT Pub. Date: Oct. 2, 2014

(65) Prior Publication Data
US 2016/0040749 A1    Feb. 11, 2016

(30) Foreign Application Priority Data

Mar. 28, 2013 (JP) .................................. 2013-069107
Mar. 24, 2014 (JP) .................................. 2014-059999

(51) Int. Cl.
*F16G 5/08*    (2006.01)
*B32B 25/10*    (2006.01)
(Continued)

(52) U.S. Cl.
CPC .................. *F16G 5/08* (2013.01); *B32B 3/30* (2013.01); *B32B 25/10* (2013.01); *F16G 5/10* (2013.01);
(Continued)

(58) Field of Classification Search
CPC .. F16G 5/20; C08L 23/16; C08L 11/00; C08L 21/00; C08K 7/02
(Continued)

(56) References Cited

U.S. PATENT DOCUMENTS 2,514,429 A * 7/1950 Waugh ...................... F16G 1/28
198/690.2
4,228,692 A * 10/1980 Jacob ........................ F16G 5/08
156/139
(Continued)

FOREIGN PATENT DOCUMENTS

EP       2711587 A1    3/2014
JP    H05-63656 B2    9/1993
(Continued)

OTHER PUBLICATIONS

Jul. 1, 2014—International Search Report—Intl App PCT/JP2014/059051.
(Continued)

*Primary Examiner* — Henry Y Liu
(74) *Attorney, Agent, or Firm* — Banner & Witcoff, Ltd.

(57) ABSTRACT

The present invention relates to a power transmission belt provided with a tension member, a tension member-supporting layer, a tension rubber layer, and a compression rubber layer, the belt having a plurality of cog portions, in which the tension member is formed of an aramid fiber, the compression rubber layer is formed of a vulcanized rubber composition containing a rubber component and aramid short fibers embedded in the vulcanized rubber composition with being (Continued)

arranged in a width direction of the belt, the power transmission belt has a strain of from 0.5 to 0.8% when compressed under a stress of 2.0 N/mm2 in the width direction, and the power transmission belt has a strain of from 0.35 to 0.7% when pulled under a load of 2 kN in the lengthwise direction.

7 Claims, 3 Drawing Sheets

(51) Int. Cl.
  B32B 3/30      (2006.01)
  F16G 5/20     (2006.01)
  F16H 9/18     (2006.01)
  F16G 5/10     (2006.01)
  C08L 77/10    (2006.01)
  C08L 79/08    (2006.01)
(52) U.S. Cl.
  CPC .............. F16G 5/20 (2013.01); F16H 9/18 (2013.01); B32B 2262/0269 (2013.01); B32B 2307/51 (2013.01); B32B 2433/04 (2013.01); C08L 77/10 (2013.01); C08L 79/085 (2013.01)
(58) Field of Classification Search
  USPC ........................................ 474/251, 263, 265
  See application file for complete search history.

(56)  References Cited

U.S. PATENT DOCUMENTS

| | | | | |
|---|---|---|---|---|
| 4,276,039 A * | 6/1981 | Takano | B29D 29/085 | 474/205 |
| 4,410,314 A * | 10/1983 | Miranti, Jr. | F16G 5/00 | 474/251 |
| 4,509,938 A * | 4/1985 | Woodland | F16G 5/20 | 474/263 |
| 4,559,029 A * | 12/1985 | Miranti, Jr. | F16G 5/00 | 474/205 |
| 4,650,442 A * | 3/1987 | Parsons | F16G 5/16 | 474/237 |
| 4,708,703 A * | 11/1987 | Macchiarulo | F16G 5/20 | 474/263 |
| 4,843,124 A * | 6/1989 | Wolfe, Jr. | C08L 11/00 | 525/165 |
| 4,994,000 A * | 2/1991 | Simon | F16G 5/20 | 474/265 |
| 5,387,160 A * | 2/1995 | Nakajima | C08K 5/39 | 428/423.1 |
| 5,498,213 A * | 3/1996 | Mishima | F16G 5/20 | 474/263 |
| 5,501,908 A * | 3/1996 | Shioyama | C08L 11/00 | 428/295.1 |
| 5,663,225 A * | 9/1997 | Ishida | C08K 5/3415 | 524/211 |
| 5,674,143 A * | 10/1997 | Kumazaki | F16G 5/20 | 474/263 |
| 5,753,369 A * | 5/1998 | Kawashima | F16G 5/20 | 428/357 |
| 5,807,194 A * | 9/1998 | Knutson | B29D 29/08 | 474/237 |
| 5,860,883 A * | 1/1999 | Jonen | C08K 5/098 | 474/205 |
| 6,117,035 A * | 9/2000 | Isshiki | F16G 1/28 | 474/204 |
| 6,379,275 B1 * | 4/2002 | Serkh | F16G 5/16 | 474/100 |
| 6,406,397 B1 * | 6/2002 | Isshiki | B29D 29/08 | 474/205 |
| 6,511,394 B2 * | 1/2003 | Okuno | C08L 23/16 | 474/237 |
| 6,620,068 B2 * | 9/2003 | Ito | B29D 29/085 | 474/205 |
| 6,689,005 B2 * | 2/2004 | Hasaka | F16G 1/06 | 474/267 |
| 6,863,632 B2 * | 3/2005 | Serkh | F16G 5/166 | 474/242 |
| 6,866,922 B2 * | 3/2005 | Takehara | F16G 1/08 | 428/295.1 |
| 6,875,144 B2 * | 4/2005 | Kinoshita | B29C 70/50 | 474/260 |
| 6,962,639 B2 * | 11/2005 | Ito | F16G 5/20 | 156/137 |
| 7,485,060 B2 * | 2/2009 | Hineno | C08L 21/00 | 428/295.1 |
| 7,780,561 B2 * | 8/2010 | Nosaka | B44C 1/228 | 156/137 |
| 8,206,251 B2 * | 6/2012 | Fan | F16G 5/20 | 474/205 |
| 8,672,788 B2 * | 3/2014 | Duke | B29D 29/08 | 474/260 |
| 9,347,521 B2 * | 5/2016 | Duke | B29D 29/08 | |
| 2001/0039226 A1 * | 11/2001 | Ito | F16G 5/20 | 474/263 |
| 2001/0044353 A1 * | 11/2001 | Nosaka | B44C 1/228 | 474/260 |
| 2002/0013192 A1 * | 1/2002 | Ito | B29D 29/085 | 474/263 |
| 2002/0039947 A1 * | 4/2002 | Hasaka | F16G 1/06 | 474/263 |
| 2004/0014544 A1 * | 1/2004 | Ito | F16G 5/20 | 474/251 |
| 2005/0037882 A1 * | 2/2005 | Hineno | C08L 21/00 | 474/263 |
| 2007/0023127 A1 * | 2/2007 | Onita | F16G 5/20 | 156/140 |
| 2007/0135251 A1 * | 6/2007 | Di Meco | B29C 67/24 | 474/205 |
| 2009/0081473 A1 * | 3/2009 | Ohno | B29D 29/08 | 428/515 |
| 2010/0004084 A1 * | 1/2010 | Fan | F16G 5/20 | 474/242 |
| 2010/0279808 A1 * | 11/2010 | Fan | F16G 5/20 | 474/205 |
| 2011/0070989 A1 * | 3/2011 | Duke | B29D 29/08 | 474/260 |
| 2011/0237375 A1 * | 9/2011 | Onita | F16G 5/20 | 474/237 |
| 2011/0300981 A1 * | 12/2011 | Takahashi | C08K 3/346 | 474/264 |
| 2012/0202634 A1 * | 8/2012 | Fan | F16G 5/20 | 474/265 |
| 2013/0053200 A1 * | 2/2013 | Fan | F16G 5/20 | 474/205 |
| 2013/0190120 A1 * | 7/2013 | Fan | F16G 5/20 | 474/205 |
| 2013/0303316 A1 * | 11/2013 | Sano | F16G 5/16 | 474/8 |
| 2014/0066244 A1 * | 3/2014 | Furukawa | F16G 5/20 | 474/263 |
| 2015/0024892 A1 * | 1/2015 | Hineno | F16G 1/10 | 474/237 |
| 2015/0369335 A1 * | 12/2015 | Ishiguro | C08K 7/02 | 474/260 |

FOREIGN PATENT DOCUMENTS

| | | |
|---|---|---|
| JP | H07-228725 A | 8/1995 |
| JP | 2005-265106 A | 9/2005 |
| JP | 3734915 B2 | 1/2006 |
| JP | 2006-183805 A | 7/2006 |
| JP | 2006-226420 A | 8/2006 |
| JP | 2012-241831 A | 12/2012 |
| KG | 1121 C1 | 12/2008 |
| RU | 2248480 C2 | 3/2005 |

(56) References Cited

FOREIGN PATENT DOCUMENTS

RU           108523 U1     9/2011
WO    2012/105024 A1    8/2012

OTHER PUBLICATIONS

Feb. 13, 2017—(RU) Search Report—App 2015140834/11.
Dec. 1, 2015—(JP) Notification of Reasons for Refusal—App 2014-059999 (Drafting date Nov. 27, 2015, dated Dec. 1, 2015).
Nov. 22, 2017—(CA) Office Action—App 2,902,421.
Apr. 23, 2018—(CA) Office Action—App 2,902,421.
Jul. 19, 2018—(CA) Office Action—App 2,902,421.
Apr. 18, 2019—(CA) Office Action—App 2,902,421.

* cited by examiner

TRANSMISSION BELT AND BELT-SPEED-CHANGE DEVICE

CROSS REFERENCE TO RELATED APPLICATIONS

This is a U.S. National Phase Application under 35 U.S.C. § 371 of International Application No. PCT/JP2014/059051, filed Mar. 27, 2014, which claims priority to Japanese Patent Application Nos. 2013-069107 and 2014-059999, filed Mar. 28, 2013 and Mar. 24, 2014, respectively, the entire disclosures of which are incorporated herein by reference.

TECHNICAL FIELD

The present invention relates to a power transmission belt that is a cogged V-belt (including a double cogged V-belt) having a plurality of convex portions (cog portions) at prescribed intervals along a lengthwise direction of a belt on an inner circumferential surface of a compression rubber layer thereof and that is useful as a variable speed belt that eliminates a phenomenon (pop-out) that tension members jump out of a belt body even though large misalignment occurs during changing a speed and has an improved belt life; and to a belt-type continuously variable transmission provided with the belt.

BACKGROUND ART

Cogged V-belt has been conventionally used as a V-belt for CVT (continuously variable transmission) used in motorcycles, ATV (four-wheeled buggy), snowmobiles and the like. The cogged V-belt has an advantage that flexibility is excellent, and is positively used in a speed-change device with small pulley diameter. However, it was required to further enhance lateral pressure resistance and bending fatigue resistance. In those cogged V-belts, there are many cases where short fibers are added as a reinforcing material to a compression rubber layer in order to improve lateral pressure resistance of the belt. Furthermore, in a variable speed belt, since misalignment occurs due to a speed-changing operation and large compressive force is applied to a belt side surface, durability of the belt was not sufficient by only addition of short fibers.

For example, Patent Document 1 discloses a rubber V-belt with cogs, which is a belt provided with an adhesion elastic body layer having cords embedded therein and holding elastic body layers (compression rubber layer) located on upper and lower sides of the adhesion elastic body layer, in which the holding elastic body layer contains chloroprene rubber, a reinforcing filler, a metal oxide vulcanizing agent, bismaleimide, and aramid short fibers, and the aramid short fibers are arranged in a width direction of the belt. In this patent document, elastic modulus in a grain direction (an orientation direction of the short fibers) is increased by the arrangement of the aramid short fibers, thereby maintaining lateral pressure resistance and improving durability. Furthermore, it is described that because too large amount of the aramid short fibers blended remarkably deteriorates bending fatigue resistance in a belt traveling direction (extension fatigue resistance), the amount is desirably 13 vol % or less. In addition, this document does not disclose the detail of the cords (tension members).

Patent Document 2 discloses a double cogged V-belt in which tension members made of para-aramid fibers are used, belt bending stiffness is from 600 to 1,200 N/mm$^3$ and dynamic compression spring constant in a belt width direction is 15,000 N/mm or more or static spring constant in the belt width direction is 4,000 N/mm or more, for the purpose of the preparation of a double cogged V-belt having excellent bending fatigue resistance without acceleration of fatigue of the tension members made of para-aramid fibers. It is further disclosed the use of the rubber composition for forming a lower cog formation part (compression rubber layer) in which chloroprene rubber is contained as a main rubber component and para-aramid fibers are used as short fibers. In the examples of this patent document, to the chloroprene rubber are blended carbon black, magnesium oxide, zinc oxide, a vulcanization accelerator, para-aramid short fibers and the like, but there are no disclosures of details of the vulcanization accelerator.

Patent Document 3 discloses a double cogged V-belt having rubber hardness of a tension rubber layer and a compression rubber layer of Hs (JIS A)=90 to 96° and rubber hardness of an adhesion rubber layer of Hs (JIS A)=83 to 89°, for the purpose of improving lateral pressure resistance to thereby improve high-load power transmission capability while preventing occurrence of cracks and separation of each rubber layer and cord in an initial stage. This patent document discloses that the tension rubber layer and compression rubber layer of the belt are formed of a short fiber-containing rubber containing 100 parts by weight of chloroprene rubber, from 40 to 60 parts by weight of a reinforcing filler, from 1 to 20 parts by weight of at least one metal oxide vulcanizing agent of zinc oxide, magnesium oxide and lead oxide, from 2 to 10 parts by weight of bismaleimide and aramid short fibers, and the aramid short fibers are arranged in a belt width direction. It is further described that the tension member may be any material such as nylon, Tetron, polyester or aramid fiber. It is further described that because too large amount of the aramid short fibers blended remarkably deteriorates bending fatigue resistance (extension fatigue resistance) in a lengthwise direction of the belt, the amount is desirably 13 vol % or less.

That is, those patent documents disclose a cogged V-belt using para-aramid fibers as tension members and using a short fiber-containing rubber composition containing chloroprene rubber having bismaleimide and aramid fibers blended thereto, as tension and compression rubber layers.

However, those patent documents do not refer to a power transmission belt applicable to misalignment, and do not suppose to control mechanical properties of tension members. Particularly, tension members are embedded so as to decrease elongation in a length direction of a belt and it is not supposed to control misalignment by imparting stretchability. Furthermore, it appears that those patent documents do not suppose the relationship between the misalignment and durability of a belt. Therefore, in those cogged V-belt, for the purpose of not accelerating fatigue of tension members made of para-aramid fibers and of improving bending fatigue resistance, belt bending stiffness and dynamic compression spring constant in a belt width direction or static spring constant in the belt width direction are specified. Furthermore, for the purpose of improving lateral pressure resistance to thereby improve high-load power transmission capability while preventing occurrence of cracks and separation of each rubber layer and cord in an initial stage, rubber hardness of the tension rubber layer and compression rubber layer and rubber hardness of the adhesion rubber layer are specified. In other words, those patent documents have an object to improve bending fatigue resistance or improve lateral pressure resistance (stiffness in a belt width direction), thereby improving high-load power transmission capability. Thus, to respond to the high-load power transmission, it was necessary to increase stiffness in a width direction of a belt and tensile modulus in a lengthwise direction of the belt. However, excessive increase in stiffness and tensile modulus makes it difficult to absorb compression stress by deforming in a belt width direction, at the time when the belt receives large lateral pressure from pulleys when large misalignment occurs during changing a speed. As a result, traveling time until the occurrence of pop-out that tension members jump out of a belt body is short, leading to shortening of a belt life.

PRIOR ART DOCUMENTS

Patent Documents

Patent Document 1: JP-B-H05-63656
Patent Document 2: JP-A-2005-265106
Patent Document 3: Japanese Patent No. 3734915

SUMMARY OF THE INVENTION

Problems to be Solved by the Invention

Accordingly, an object of the present invention is to provide a power transmission belt capable of suppressing the occurrence of pop-out even when large misalignment occurs when changing a speed to improve a belt life; and a belt-type continuously variable transmission provided with the belt.

Means for Solving the Problems

As a result of intensive investigations to achieve the above object, the present inventors have found that when designing stiffness of a belt in width direction so as to be slightly small as compared with the conventional power transmission belt and designing elongation of the belt in a lengthwise direction during applying a prescribed load so as to be slight large as compared with the conventional power transmission belt using an aramid tension member to thereby intentionally adjust to make the belt easy deform by compression in the width direction and make the belt easy elongate in the lengthwise direction, the belt can absorb a compression force in a belt width direction and a tensile force in a belt lengthwise direction generated when changing a speed and can respond to misalignment, and traveling time until the occurrence of pop-out phenomenon that tension members jump out of a belt body can be prolonged to thereby improve a belt life, and they have completed the present invention.

That is, the power transmission belt of the present invention is provided with a tension member extending in a lengthwise direction of a belt, a tension member-supporting layer in contact with at least a part of the tension member, a tension rubber layer formed on one surface of the tension member-supporting layer, and a compression rubber layer formed on the other surface of the tension member-supporting layer, which has a plurality of cog portions formed on an inner circumferential surface of the compression rubber layer along the lengthwise direction of the belt at a prescribed interval, and which can frictionally engage with a pulley on a side surface of the compression rubber layer. In this power transmission belt, the tension member is formed of an aramid fiber, the compression rubber layer is formed of a vulcanized rubber composition comprising a rubber component and aramid short fibers, and the aramid short fibers are embedded in the vulcanized rubber composition with being arranged in a width direction of the belt. Further, the power transmission belt has a strain of from 0.5 to 0.8% when compressed under a stress of 2.0 N/mm$^2$ in the width direction, and the power transmission belt has a strain of from 0.35 to 0.7% when pulled under a load of 2 kN in the lengthwise direction. The aramid fiber of the tension member may be a polyparaphenylene terephthalamide fiber. The rubber component of the compression rubber layer may be chloroprene rubber. The vulcanized rubber composition of the compression rubber layer may further contain bismaleimide. The aramid short fibers preferably have a proportion of from 10 to 40 parts by mass and the bismaleimide preferably has a proportion of about from 1 to 15 parts by mass per 100 parts by mass of the rubber component. The compression rubber layer may be formed of a vulcanized rubber composition having a bending stress when a strain in a thickness direction reached 10%, of from 3.5 to 6.0 MPa, when performing press vulcanization at a temperature of 160° C. under a pressure of 2.0 MPa for 20 minutes. The power transmission belt of the present invention may be used in a continuously variable transmission.

The present invention also include a belt-type continuously variable transmission containing: a continuously variable transmission (A) containing two pulley parts each having a rotating shaft (A1), a fixed sheave (A2) and a movable sheave (A3); and a power transmission belt (B), in which the rotating shafts (A1) of the two pulley parts are arranged in parallel with each other, the fixed sheave (A2) is mounted on each rotating shaft (A1) so as to be integrally rotatable with the rotating shaft, the movable sheave (A3) is mounted so as to face the fixed sheave, form a V-shaped groove shape and be movable in a shaft direction of the rotating shaft, and the power transmission belt (B) is hung across the sheaves of the two pulley parts, and in which the power transmission belt (B) is the power transmission belt of the present invention.

Advantages of the Invention

In the present invention, because stiffness in a belt width direction is designed so as to be slightly small as compared with the conventional power transmission belt and elongation in a lengthwise direction of a belt during applying a prescribed load is designed so as to be slight large as compared with the conventional power transmission belt using an aramid tension member to thereby intentionally adjust to make the belt easy deform by compression in the width direction and make the belt easy elongate in the lengthwise direction, pop-out can be suppressed from occurring even though large misalignment is generated when changing a speed, to thereby improve a belt life.

MODE FOR CARRYING OUT THE INVENTION

[Power Transmission Belt]

A power transmission belt of the present invention is provided with a tension member extending in a lengthwise direction of a belt, a tension member-supporting layer (an adhesion rubber layer) in contact with at least a part of the tension member, a tension rubber layer formed on one surface of the tension member-supporting layer, and a compression rubber layer formed on the other surface of the tension member-supporting layer. A plurality of convex portions (cog portions) are formed on an inner circumferential surface of the compression rubber layer along the lengthwise direction of the belt at a prescribed interval, and the belt frictionally engages with pulleys on a side surface of the compression rubber layer. Such a power transmission belt includes a cogged belt having the cog portions formed on only the compression rubber layer, and a double cogged belt having similar cog portions formed on an outer circumferential surface of the tension rubber layer in addition to the compression rubber layer. The cogged belt is preferably a V-belt in which a side surface of a compression rubber layer is in contact with pulleys (particularly, a variable speed belt used in a power transmission in which a power transmission gear ratio is continuously variable during a belt is traveling). Examples of the cogged V-belt includes a raw edge cogged V-belt and a raw edge double cogged V-belt.

Figure 1:
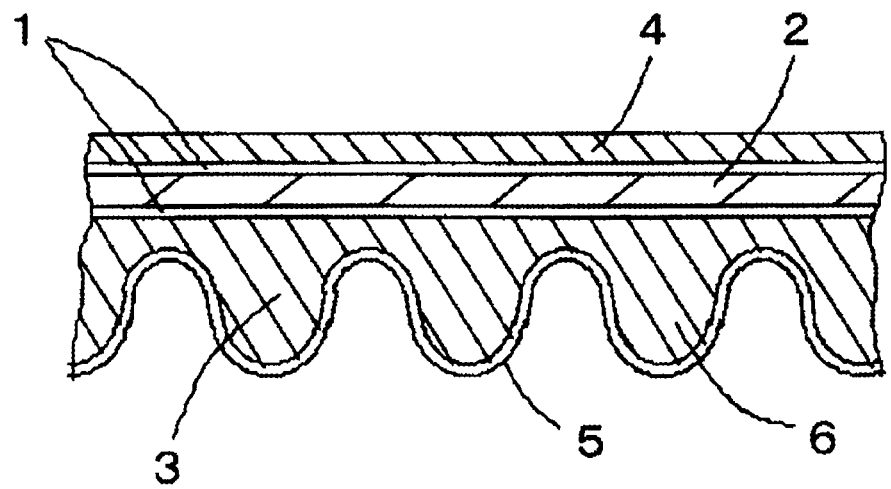
FIG. 1 is a schematically cross-sectional view illustrating one example of a raw edge cogged V-belt of the present invention.

FIG. 1 is a schematically cross-sectional view illustrating one example of a transmission V-belt (a raw edge cogged V-belt) of the present invention. In this example, the transmission V-belt containing a tension member 2 embedded in a tension member-supporting layer 1, a compression rubber layer 3 laminated on one surface of the tension member-supporting layer 1, and a tension rubber layer 4 laminated on the other surface of the tension member-supporting layer 1. The tension member 2 is integrally embedded in the form that it is sandwiched between a pair of upper and lower rubber sheets for the tension member-supporting layers, and is arranged in side-by-side at a prescribed pitch parallel to a lengthwise direction of the belt. Furthermore, a reinforcing fabric 5 is laminated on the compression rubber layer 3, and cog portions 6 are formed by a mold with cogs. Cross-sectional shape of each cog portion 6 in the lengthwise direction of the belt is a mountain shape (approximately semicircular shape) or a trapezoidal shape. That is, each cog portion 6 projects in a cross-sectional mountain shape or trapezoidal shape from a cog bottom in a thickness direction of the belt. The laminate of the compression rubber layer 3 and the reinforcing fabric 5 is integrally formed by vulcanizing a laminate of a reinforcing fabric and a compression rubber layer sheet (an unvulcanized rubber sheet). The cross-sectional shape in a belt width direction is a trapezoidal shape in which a belt width is decreased toward an inner circumferential side of a belt from an outer circumferential side thereof.

Figure 2:
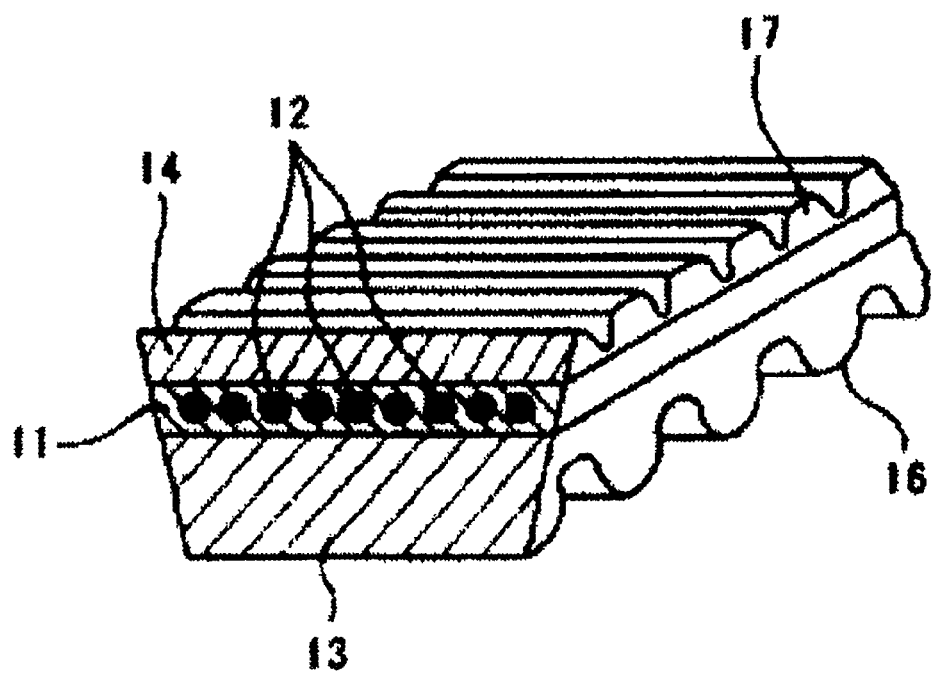
FIG. 2 is a schematically perspective view illustrating one example of a double cogged V-belt of the present invention.

FIG. 2 is a schematically perspective view illustrating one example of a double cogged V-belt. The double cogged V-belt is that in a raw edge cogged V-belt in which a compression rubber layer 13 and a tension rubber layer 14 are formed on both surfaces of a tension member-supporting layer 11 having a tension member 12 embedded therein, respectively, cog portions 16 and 17 are formed on the compression rubber layer 13 and the tension rubber layer 14, respectively. Although not illustrated, in this belt, a reinforcing fabric is applied on the surfaces of the tension rubber layer 14 and the compression rubber layer 13.

Height and pitch of the cog portions are the same as in the conventional cogged V-belt. In the compression rubber layer, the height of the cog portions may be from about 50 to 95% (particularly, from 60 to 80%) of the thickness of the entire compression rubber layer, and the pitch of the cog portions (distance between the central portions of the neighboring cog portions) may be from about 50 to 250% (particularly, 80 to 200%) of the height of the cog portions. The case of forming the cog portions on the tension rubber layer is the same as above.

(Tension Member)

It is sufficient for the tension member if only at least a part thereof is in contact with the tension member-supporting layer (adhesion rubber layer), and it is not limited to the embodiment that the tension member is embedded in the tension member-supporting layer. It may be the embodiment that the tension member is embedded between the tension member-supporting layer and the tension rubber layer, and may be the embodiment that the tension member is embedded between the tension member-supporting layer and the compression rubber layer. Of those embodiments, the embodiment that the tension member is embedded in the tension member-supporting layer is preferred from that pop-out can be suppressed.

The tension member affects tensile modulus in a lengthwise direction of a belt, and is formed of an aramid fiber. The aramid fiber is preferably a fully aromatic polyamide fiber obtained from aromatic diamine and aromatic dicarboxylic acid.

Examples of the aromatic diamine include arylene diamine such as phenylenediamine, diaminotoluene, xylenediamine, 1,4-naphthalenediamine, and biphenylenediamine; bis(aminoaryl)ether such as bis(4-aminophenyl)ether and 3,4'-diaminodiphenyl ether; bis(aminoaryl)ketone such as bis(4-aminophenyl)ketone; bis(aminoaryl)sulfone such as bis(4-aminophenyl)sulfone; and bis(aminoaryl)alkane such as diaminodiphenylmethane, bis(4-amino-3-ethylphenyl)methane, bis(4-amino-3-methylphenyl)methane, and 2,2'-bis(4-aminophenyl)propane. Those aromatic diamines can be used alone or as mixtures of two or more kinds thereof. Of those, symmetric diamine in which amino groups are symmetrically positioned, such as paraphenylenediamine, is preferred.

Examples of the aromatic dicarboxylic acid include arylene dicarboxylic acid or acid anhydride thereof, such as phthalic acid, phthalic anhydride, isophthalic acid, terephthalic acid, and naphthalene dicarboxylic acid (2,6-naphthalene dicarboxylic acid, 1,6-naphthalene dicarboxylic acid and the like); and biarylene dicarboxylic acid such as 4,4'-biphenyl dicarboxylic acid. Those aromatic dicarboxylic acids can be used alone or as mixtures of two or more kinds thereof. Of those, symmetric dicarboxylic acid in which carboxyl groups are symmetrically positioned, such as terephthalic acid, is preferred.

The aramid fiber is preferably a para-aramid fiber from the view point that it has appropriate stretchability and can adjust strain to an appropriate range when a power transmission belt is pulled under a prescribed load in a length direction. Particularly preferred is polyparaphenylene terephthalamide fiber.

Polyparaphenylene terephthalamide resin constituting the polyparaphenylene terephthalamide fiber contains homo- or copolyester containing paraphenylene terephthalamide unit as a main component in a proportion of, for example, 50 mol % or more, preferably from 80 to 100 mol %, and still more preferably from 90 to 100 mol % (particularly from 95 to 100 mol %). Examples of a copolymerizable monomer constituting the copolyester include aromatic diamine (3,4'-diamino-diphenyl ether, etc.) and aromatic dicarboxylic acid (isophthalic acid, etc.). Commercially available polyparaphenylene terephthalamide fibers include polyparaphenylene terephthalamide fiber (e.g., "TWARON (registered trademark)" manufactured by Teijin Limited, and "KEVLAR (registered trademark)" manufactured by Du Pont-Toray Co., Ltd.), a copolymer fiber between polyparaphenylene terephthalamide and 3,4'-oxydiphenylene terephthalamide (e.g., "TECHNORA (registered trademark)" manufactured by Teijin Limited), and the like. Of those, polyparaphenylene terephthalamide fiber (standard modulus type) is particularly preferred from the view point that strain when a power transmission belt is pulled under a prescribed load in a length direction can be adjusted to an appropriate range.

Raw yarn of an aramid fiber (an aramid tension member) only has to have strength durable to the traveling of a power transmission belt, and example thereof includes a multifilament yarn containing a monofilament of an aramid fiber (aramid multifilament yarn).

The aramid multifilament yarn only has to contain a plurality of monofilament yarns, and may contain monofilament yarns of, for example, from 100 to 5,000, preferably from 500 to 4,000, and more preferably from 1,000 to 3,000, from the standpoint of durability of a power transmission belt.

The average fineness of the monofilament yarn is, for example, from 1 to 10 dtex, preferably from 1.2 to 8 dtex, and more preferably from 1.5 to 5 dtex.

The aramid multifilament yarn may be used without bundling monofilament yarns with each other (e.g., untwisting), and may be used by bundling a plurality of monofilament yarns by bundling means (e.g., twisting, intermingling, binding, etc.).

Twisted yarn (or cord) may be a single-direction twisted yarn comprising a plurality of monofilament yarns as a single fiber, in which at least one single fiber is right-twisted (S-twisted) or left-twisted (Z-twisted). The single fiber may contain monofilament yarns of, for example, from 10 to 2,000, preferably from 100 to 1,800, and more preferably 500 to 1,500, from the viewpoint of strength. The average fiber fineness of the single fiber may be, for example, from 500 to 3,000 dtex, preferably from 1,000 to 2,500 dtex, and more preferably from 1,500 to 2,000 dtex.

Generally, the single-direction twisted yarn often contains single yarns of from 1 to 6, preferably from 1 to 4, and more preferably from 1 to 3 (e.g., from 1 to 2). In the case where the single-direction twisted yarn contains a plurality of single yarns, a plurality of single yarns are often bundled (uniformly arranged) and twisted.

The single-direction twisted yarn may be, for example, a soft twist yarn or a moderate twist yarn (particularly, a soft twist yarn). The twist number of the single-direction twisted yarn is, for example, from 20 to 50 turns/m, preferably from 25 to 45 turns/m, and more preferably from 30 to 40 turns/m. In the single-direction twisted yarn, the twist coefficient (T.F.) represented by the following equation (1) may be, for example, from 0.01 to 1, and preferably from 0.1 to 0.8.

$$\text{Twist coefficient} = [\text{twist number (turns/m)} \times \sqrt{\text{total fineness (tex)}}]/960 \quad (1)$$

The twisted yarn is preferably a yarn obtained by finally twisting a plurality of single-direction twisted yarns as a first twist yarn (e.g., an organzine (piled yarn), Koma twist yarn or Lang lay yarn) from the standpoint of further improving strength, and may be a twisted yarn obtained by finally twisting a single-direction twisted yarn and a single fiber as first twist yarns (e.g., a corkscrew yarn). The number of the first twist yarn constituting those twisted yarns may be, for example, from 2 to 5, preferably from 2 to 4, and more preferably from 2 to 3. Furthermore, the direction of the single-direction twist (first twist direction) and the final twist direction may be either of the same direction and the reverse direction, and the same direction (Lang twisting) is preferred from the standpoint of bending fatigue resistance.

The twist number of the final twisting is important in adjusting strain when a belt is pulled in a length direction under a load of 2 kN. The twist number of the final twisting may be, for example, from 50 to 200 turns/m, preferably from 80 to 180 turns/m, and more preferably from 100 to 150 turns/m. In the final twisting, the twist coefficient represented by the equation (1) above may be, for example, from 0.5 to 6.5, preferably from 0.8 to 5, and more preferably from 1 to 4.

The average diameter of raw yarns of the aramid tension members may be, for example, from 0.2 to 2.5 mm, preferably from 0.4 to 2 mm, and more preferably from 0.5 to 1.5 mm.

In order to improve adhesiveness to a rubber component, the tension member can be treated through various adhesion treatments, for example, by a treatment liquid containing an initial condensate between phenols and formalin (a prepolymer of novolac or resol type phenol resin, etc.), a treatment liquid containing a rubber component (latex), a treatment liquid containing the initial condensate and rubber component (latex), or a treatment liquid containing a reactive compound (adhesion compound) such as a silane coupling agent, an epoxy compound (an epoxy resin, etc.) or an isocyanate compound. In the preferred adhesion treatment, the tension member may be subjected to an adhesion treatment using the treatment liquid containing the initial condensate and rubber component (latex), particularly at least by a resorcin-formalin-latex (RFL) liquid. Generally, in the adhesion treatment, fibers are dipped in the RFL liquid, followed by heating and drying, thereby an adhesion layer can be uniformly formed on the surface. Examples of the latex of the RFL liquid include chloroprene rubber, a styrene-butadiene-vinyl pyridine terpolymer, hydrogenated nitrile rubber (H-NBR), and nitrile rubber (NBR). Those treatment liquids may be used by combining those. For example, the tension member may be subjected to an adhesion treatment such as a pre-treatment (pre-dipping) with a conventional adhesion component such as a reactive compound (adhesion compound) such as an epoxy compound (an epoxy resin, etc.) or an isocyanate compound or a rubber paste treatment (overcoating) after an RFL treatment, and then treated with the RFL liquid.

(Compression Rubber Layer and Tension Rubber Layer)
(1) Rubber Component

Examples of the rubber component contained in a vulcanized rubber composition forming the compression rubber layer and tension rubber layer include vulcanizable or crosslinkable rubbers, for example, diene rubber (natural rubber, isoprene rubber, butadiene rubber, butyl rubber, chloroprene rubber, styrene-butadiene rubber (SBR), acrylonitrile-butadiene rubber (nitrile rubber), acrylonitrile-chloroprene rubber, or hydrogenated nitrile rubber, etc.), ethylene-α-olefin elastomer, chlorosulfonated polyethylene rubber, alkylated chlorosulfonated polyethylene rubber, epichlorohydrin rubber, acrylic rubber, silicone rubber, urethane rubber, and fluorine rubber. Those rubber components can be used alone or as mixtures of two or more kinds thereof.

Of those, ethylene-α-olefin elastomer (ethylene-α-olefin rubber such as ethylene-propylene rubber (EPR) or ethylene-propylene-diene monomer (EPDM)), and chloroprene rubber are preferred, and chloroprene rubber is particularly preferred from the view point that compression strain of the compression rubber layer in a belt width direction is easily adjusted to an appropriate range. The proportion of the chloroprene rubber in the rubber component may be about 50 mass % or more (particularly from 80 to 100 mass %). The chloroprene rubber may be sulfur-modified type and may be non-sulfur-modified type.

(2) Short Fiber

The vulcanized rubber composition forming the compression rubber layer contains short fibers in addition to the rubber component, and it is preferred that the tension rubber layer also contains short fibers. Aramid short fibers are used as the short fibers from the view point that they are stiff in a belt width direction and have high strength and modulus. The aramid short fibers further have high abrasion resistance.

In the compression rubber layer, the aramid short fibers are oriented along a belt width direction. In the case where the tension rubber layer contains the aramid short fibers, it is preferred that the aramid short fibers are oriented along a belt width direction, too. A method for orienting aramid short fibers in a belt width direction is generally, for example, a method of rolling with pressure by rolls.

Aramid short fibers exemplified in the item of the aramid tension member can be used as the aramid short fibers. Among commercially available products, use can be made of, for example, polyparaphenylene terephthalamide fiber (e.g., "TWARON (registered trademark)" manufactured by Teijin Limited, and "KEVLAR (registered trademark)" manufactured by Du Pont-Toray Co., Ltd.), a copolymer fiber of polyparaphenylene terephthalamide and 3,4'-oxydiphenylene terephthalamide (e.g., "TECHNORA (registered trademark)" manufactured by Teijin Limited), and polymetaphenylene isophthalamide fiber that is meta-type (e.g., "CONEX (registered trademark)" manufactured by Teijin Limited and "NOMEX (registered trademark)" manufactured by Du-Pont). Of those, the same polyparaphenylene terephthalamide fiber as in the aramid tension member is preferred, and polyparaphenylene terephthalamide fiber (standard modulus type) is particularly preferred, from the view point that it has the properties that tensile modulus is small, appropriate stiffness in a belt width direction can be maintained and compressive force in a belt width direction can be appropriately be absorbed.

The average length of the aramid short fibers is, for example, from 1 to 20 mm, preferably from 2 to 15 mm, and more preferably from 3 to 10 mm, and the average fiber diameter thereof is, for example, from 5 to 50 μm, preferably from 7 to 40 μm, and more preferably from 10 to 35 μm.

The aramid short fibers may be subjected to an adhesion treatment (or a surface treatment) in the same manner as in the tension member. Similar to the aramid tension member, the aramid short fibers are preferably subjected to an adhesion treatment with at least an RFL liquid.

The proportion of the aramid short fibers is, for example, from 10 to 40 parts by mass, preferably from 15 to 35 parts by mass, and more preferably from 20 to 30 parts by mass, per 100 parts by mass of the rubber component. Where the proportion of the aramid short fibers is too small, stiffness in a belt width direction is decreased and deformation becomes easy to occur by the decrease of lateral pressure resistance, as a result, belt life becomes short. On the other hand, where the proportion is too large, bending fatigue resistance of the compression rubber layer and tension rubber layer (particularly, compression rubber layer) is decreased (the compression rubber layer becomes hard and bending stress is increased), as a result, loss by bending is increased in the state that a winding diameter of a belt is small and fuel saving property is deteriorated.

The proportion of the aramid short fibers is a great factor to adjust strain when a belt is compressed under a stress of 2.0 N/mm$^2$ in a width direction to from 0.5 to 0.8%, and by this factor, the power transmission belt of the present invention achieves the characteristics that stiffness in a belt width direction can be maintained and compressive force in a belt width direction can be absorbed. When polyparaphenylene terephthalamide fibers are selected as the aramid short fibers and adjusted to the above proportion, the belt characteristics described above can be easily achieved.

The vulcanized rubber composition forming the compression rubber layer and tension rubber layer may contain other short fibers in addition to the aramid short fibers. Examples of the other short fibers include synthetic fibers such as polyolefin fibers (polyethylene fibers or polypropylene fibers, etc.), polyamide fibers (polyamide 6 fibers, polyamide 66 fibers or polyamide 46 fibers, etc.), polyalkylene arylate fibers [$C_{2-4}$ alkylene $C_{6-14}$ arylate fibers such as polyethylene terephthalate (PET) fibers or polyethylene naphthalate (PEN) fibers, etc.], vinylon fibers, polyvinyl alcohol fibers, and polyparaphenylene benzobisoxazole (PBO) fibers; natural fibers such as cotton, hemp and wool; and inorganic fibers such as carbon fibers. The average length and average fiber diameter of the other short fibers may be the same as in the aramid short fibers, and the other short fibers may be similarly subjected to the adhesion treatment as in the aramid short fibers.

When the rubber composition contains the other short fibers, the total amount of the aramid short fibers and the other short fibers is, for example, from 15 to 45 parts by mass, preferably from 20 to 40 parts by mass, and more preferably from 25 to 35 parts by mass, per 100 parts by mass of the rubber component. Where the proportion of the short fibers is too large, dispersibility of the short fibers in the rubber composition is decreased, resulting in poor dispersibility, and there is a possibility that cracks occur in the compression rubber layer or tension rubber layer in an early stage starting from the portion.

(3) Other Additives

As necessary, the vulcanized rubber composition for forming the compression rubber layer and tension rubber layer may contain a vulcanizing agent or a crosslinking agent (or a crosslinking agent type), a co-crosslinking agent, a vulcanization assistant, a vulcanization accelerator (e.g., a thiuram accelerator such as tetramethylthiuram.disulfide (TMTD) or dipentamethylenethiuram tetrasulfide (DPTT), a thiazole accelerator such as 2-mercaptobenzothiazole, a sulfenamide accelerator such as N-cyclohexyl-2-benzothiazylsulfenamide (CBS), guanidines, and a urea or thiourea accelerator), a vulcanization retarder, a metal oxide (e.g., zinc oxide, magnesium oxide, calcium oxide, barium oxide, iron oxide, copper oxide, titanium oxide, or aluminum oxide), an enhancer (carbon black, or silicon oxide such as hydrated silica, etc.), a filler (clay, calcium carbonate, talc, or mica, etc.), a softener (e.g., oils such as paraffin oil or naphthenic oil), a processing agent or a processing aid (stearic acid, stearic acid metal salt, wax, or paraffin, etc.), an age resister (an antioxidant, a thermal age resister, an antiflex-cracking agent, or an antiozonant, etc.), a colorant, a tackifier, a plasticizer, a coupling agent (a silane coupling agent, etc.), a stabilizer (an ultraviolet absorber or a thermal stabilizer, etc.), a flame retardant, an antistatic agent, and the like. The metal oxide may act as a crosslinking agent.

As the vulcanizing agent or crosslinking agent, the conventional components can be used depending on the kind of the rubber component. When the rubber component is chloroprene rubber, metal oxide (magnesium oxide or zinc oxide, etc.) may be used as the vulcanizing agent or crosslinking agent. The metal oxide may be used by combining with another vulcanizing agent (a sulfur vulcanizing agent, etc.), and the metal oxide and/or sulfur vulcanizing agent may be used alone or by combining with a vulcanization accelerator. The proportion of the vulcanizing agent can be selected from a range of from about 1 to 20 parts by mass (particularly from 3 to 15 parts by mass) per 100 parts by mass of the rubber component, depending on the kind of the vulcanizing agent and the rubber component.

The conventional crosslinking aids can be used as the co-crosslinking agent (a crosslinking aid or a co-vulcanizing agent, co-agent). Use can be made of bismaleimides (aliphatic bismaleimide, for example, alkane bismaleimide such as N,N'-1,2-ethylene bismaleimide, and cycloalkane bismaleimide such as 1,6'-bismaleimide-(2,2,4-trimethyl)cyclohexane; arene bismaleimide or aromatic bismaleimide, for example, arene bismaleimide such as N,N'-m-phenylene bismaleimide or 4-methyl-1,3-phenylene bismaleimide, diarylalkane bismaleimide such as 4,4'-diphenylmethane bismaleimide, bis[(diaryloxy)arene bismaleimide]alkane such as 2,2-bis[4-(4-maleimidophenoxy)phenyl]propane, diaryl ether bismaleimide such as 4,4'-diphenylether bismaleimide, diarylsulfone bismaleimide such as 4,4'-diphenylsulfone bismaleimide, and (diaryloxy)arene bismaleimide such as 1,3-bis(3-maleimidophenoxy)benzene; and the like), depending on the rubber component (e.g., chloroprene rubber). Those crosslinking aids can be used alone or as mixtures of two or more kinds thereof. Of those, arene bismaleimide or aromatic bismaleimide, such as N,N'-m-phenylene dimaleimide, is preferred. In the present invention, the degree of crosslinking is adjusted by the addition of the co-crosslinking agent (particularly bismaleimides), thereby stiffness in a belt width direction can be adjusted, and additionally adhesion wear can be prevented. For this reason, the use of the co-crosslinking agent is preferred.

The proportion of the co-crosslinking agent (particularly bismaleimides) is, for example, from 1 to 15 parts by mass, preferably from 1 to 10 parts by mass, and more preferably from 2 to 8 parts by mass, per 100 parts by mass of the rubber component, in terms of solid contents.

The proportion of the enhancer and filler (particularly, the enhancer such as carbon black) is, for example, from 1 to 100 parts by mass, preferably from 3 to 80 parts by mass, and more preferably from 5 to 50 parts by mass, per 100 parts by mass of the rubber component.

The proportion of the softener (oils such as naphthenic oil) is, for example, from 1 to 30 parts by mass, preferably from 3 to 20 parts by mass, and more preferably from 4 to 10 parts by mass, per 100 parts by mass of the rubber component.

The thickness of the compression rubber layer is, for example, from 2 to 25 mm, preferably from 3 to 16 mm, and more preferably from 4 to 12 mm. The thickness of the tension rubber layer is, for example, from 0.8 to 10 mm, preferably from 1.2 to 6.5 mm, and more preferably from 1.6 to 5.2 mm.

The vulcanized rubber composition forming the compression rubber layer preferably has a bending stress when strain in a thickness direction has reached 10%, of from 3.5 to 6.0 MPa (e.g., from 4 to 5.5 MPa), when press-vulcanized at a temperature of 160° C. under a pressure of 2.0 MPa for 20 minutes. Where the bending stress when strain in a thickness direction has reached 10% exceeds 6.0 MPa, a belt becomes too hard and compressive force in a belt width direction and tensile force in a belt lengthwise direction generated when changing a speed cannot be absorbed, misalignment occurs, and pop-out phenomenon that tension member projects from a belt body is easy to occur. On the other hand, where the bending stress when strain in a thickness direction has reached 10% is less than 3.5 MPa, a belt becomes too soft and easy to deform, pop-out is easy to occur.

(Tension Member-Supporting Layer)

The same vulcanized rubber composition (a rubber composition containing a rubber component such as chloroprene rubber) as in the compression rubber layer and tension rubber layer and the like can be used in the tension member-supporting layer (adhesion rubber layer). In the vulcanized rubber composition for the tension member-supporting layer, the same series or the same kind of rubbers as in the rubber component of the vulcanized rubber composition for the compression rubber layer are frequently used as the rubber component. The vulcanized rubber composition for forming the tension member-supporting layer may contain the same additives as in the compression rubber layer and tension rubber layer. For example, it may contain a vulcanizing agent or a crosslinking agent (e.g., metal oxide such as magnesium oxide or zinc oxide, or sulfur vulcanizing agent such as sulfur), a co-crosslinking agent or a crosslinking aid (e.g., maleimide crosslinking agent such as N,N'-m-phenylene dimaleimide), a vulcanization accelerator (TMTD, DPTT or CBS, etc.), an enhancer (carbon black or silica, etc.), a softener (e.g., oils such as naphthenic oil), a processing agent or a processing aid (stearic acid, stearic acid metal salt, wax, or paraffin, etc.), an age resister, an adhesiveness improving agent (a resorcin-formaldehyde co-condensate or an amino resin, etc.), a filler (clay, calcium carbonate, talc, or mica, etc.), a colorant, a tackifier, a plasticizer, and the like. The proportions of the vulcanizing agent or crosslinking agent, and the co-crosslinking agent or crosslinking aid can be selected from the same ranges as in the vulcanized rubber compositions for the compressive rubber layer and tension rubber layer.

The thickness of the tension member-supporting layer can be appropriately selected depending on the kind of the belt, and is, for example, from 0.4 to 3.0 mm, preferably from 0.6 to 2.2 mm, and more preferably from 0.8 to 1.4 mm.

(Reinforcing Fabric)

The case of using a reinforcing fabric in the power transmission belt is not limited to the embodiment in which the reinforcing fabric is laminated on the surface of the compressive rubber layer, and may be, for example, the embodiment in which the reinforcing fabric is laminated on the surface of the tension rubber layer (the surface opposite the surface in contact with the tension member-supporting layer), and the embodiment in which the reinforcing layer is embedded in the compression rubber layer and/or the tension rubber layer. The reinforcing fabric can be formed of, for example, a fabric material such as a woven fabric, a wide-angle canvas, a knitted fabric, or a non-woven fabric (preferably a woven fabric), and as necessary, it may be laminated on the surface of the compression rubber layer and/or the tension rubber layer after being subjected to the adhesion treatment described above, for example, a treatment with RFL liquid (dipping treatment, etc.), friction in which the rubber for the tension member-supporting layer is rubbed in the fabric material, or lamination (coating) of the rubber for the tension member-supporting rubber layer and the fabric material.

In the description, in the case where the reinforcing fabric is laminated on the surface of the compressive rubber layer or the tension rubber layer, the compression rubber layer or the tension rubber layer is frequently defined by the embodiment including the reinforcing fabric (that is, the laminate of the compression rubber layer or tension rubber layer and the reinforcing fabric).

[Production Method of Power Transmission Belt]

The production method of the power transmission belt of the present invention is not particularly limited, and regarding a lamination step of each layer (production method of a belt sleeve), the conventional method can be used.

For example, as one example of the production method of a double cogged V-belt as illustrated in FIG. 2, a laminate containing the reinforcing fabric (lower fabric) and the compression rubber layer sheet (unvulcanized rubber) is arranged in a mold with flat cogs, in which tooth portions and groove portions are alternatively provided, in the state of the reinforcing fabric down, and press-pressurization is conducted at a temperature of from 60 to 100° C. (particularly, from 70 to 80° C.) to prepare a cog pad having cog portions embossed (a pad which is not completely vulcanized and is in a semi-vulcanized state), and thereafter both ends of the cogged pad may be vertically cut from the top of a mountain portion of the cog. Furthermore, a molded article may be prepared by covering a cylindrical mold with an inner mother mold made of a vulcanized rubber having tooth portions and groove portions alternately provided, winding the cog pad so as to be engaged with the tooth portions and groove portions to joint at the top of the cog mountain portion, laminating a rubber sheet for a first tension member-supporting layer (rubber for a lower tension member-supporting layer: unvulcanized rubber) on the cog pad wound, spinning the tension member spirally, and sequentially winding thereon a rubber sheet for a second tension member-supporting layer (rubber for an upper tension member-supporting layer: the same as the rubber sheet for the lower tension member-supporting layer), a sheet for a tension rubber layer (unvulcanized rubber) and a reinforcing fabric (an upper fabric). Thereafter, the mold is covered with a jacket made of vulcanized rubber and placed in a vulcanization can, and vulcanization is conducted at a temperature of from about 120 to 200° C. (particularly, from 150 to 180° C.) to prepare a belt sleeve. The belt sleeve is then cut into a V-shape by using a cutter or the like.

[Characteristics of Power Transmission Belt]

The characteristics of the power transmission belt of the present invention obtained are that strain when the belt is compressed in a width direction under a stress of 2.0 N/mm² (stiffness in a belt width direction) and strain when the belt is pulled in a lengthwise direction under a load of 2 kN satisfy the following characteristics.

That is, the stiffness in a belt width direction is that the strain when the belt is compressed in a width direction under a stress of 2.0 N/mm² is from 0.5 to 0.8%, preferably from 0.52 to 0.75%, and more preferably from 0.53 to 0.7% (particularly from 0.55 to 0.65%). Within this range, in the case where a power transmission belt is mounted between two pairs of sheaves (pulleys) of a continuously variable transmission in which fixed sheaves are provided on two rotating shafts arranged in parallel and integrally rotatable with the rotating shafts and movable sheaves are provided to face the fixed sheave to form a V-shaped groove shape, and is traveled, even though large misalignment occurs when changing a speed and the belt receives large lateral pressure from the sheave, the belt deforms in a belt width direction to absorb compressive force and the traveling time until pop-out occurs is prolonged. Where the compressive strain in a belt width direction exceeds 0.8%, inner strain is increased in the interface between the tension member and the tension member-supporting layer, there is a possibility that the tension member is easy to peel and pop-out is easy to occur in a short traveling time. On the other hand, where the compressive strain is less than 0.5%, compressive force in a belt width direction cannot be absorbed and pop-out is easy to occur in a short traveling time.

The strain when the belt is compressed in a width direction under a stress of 2.0 N/mm² can be measured by the method described in Examples described hereinafter.

The stiffness in a belt length direction is that the strain when the belt is pulled in a length direction under a load of 2 kN is from 0.35 to 0.7% (e.g., from 0.40 to 0.69%), preferably from 0.5 to 0.68% (e.g., from 0.55 to 0.68%), and more preferably from about 0.6 to 0.65%. Within this range, in the case where the power transmission belt is mounted between two pairs of sheaves (pulleys) of the above-mentioned continuously variable transmission and is traveled, even though large misalignment occurs when changing a speed and the belt receives large lateral pressure from the sheaves, the belt deforms in a length direction to absorb tensile force and the traveling time until pop-out occurs is prolonged. Where the tensile strain in a belt length direction exceeds 0.7%, inner strain is increased in the interface between the tension member and the tension member-supporting layer, and there is a possibility that the tension member is easy to peel and pop-out is easy to occur in a short traveling time. On the other hand, where the tensile strain is less than 0.35%, the belt cannot absorb tensile force in a length direction and pop-out is easy to occur in a short traveling time.

The strain when the belt is pulled in a length direction under a load of 2 kN can be measured by the method described in Examples described hereinafter.

[Belt-Type Continuously Variable Transmission]

The belt-type continuously variable transmission of the present invention is a belt-type continuously variable transmission containing a continuously variable transmission containing two pulley parts each containing a rotating shaft, a fixed sheave and a movable sheave, and the power transmission belt of the present invention. The rotating shafts of the two pulley parts are arranged in parallel with each other, the fixed sheave is mounted on each rotating shaft so as to be capable of integrally rotating with the rotating shaft, the movable sheave is mounted to be movable in a shaft direction of the rotating shaft to face the fixed sheave so as to form a V-shaped groove shape, and the power transmission belt is hung across the sheaves of the two pulley parts.

Figure 3:
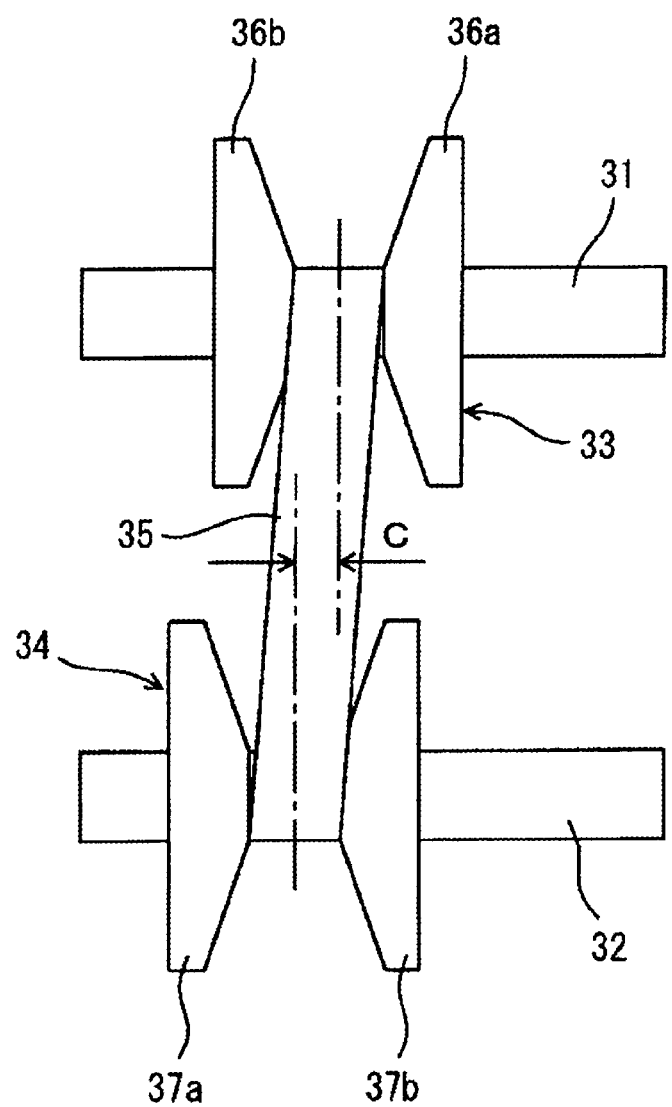
FIG. 3 is a schematic view of a continuously variable transmission.

FIG. 3 is a schematic view of a (stepless) belt-type continuously variable transmission of the present invention. This speed-change device is provided with two pulley shafts (rotating shafts) 31 and 32 that are parallel to each other, a driving side speed-changing (primary) pulley 33 and a driven side speed-changing (secondary) pulley 34 that are arranged on each pulley shaft, and a variable speed belt 35 wound on the driving side speed-changing pulley and the driven side speed-changing pulley.

The driving side speed-changing pulley 33 has conical surfaces facing to each other, and has a fixed sheave 36a fixed to the pulley shaft 31 immovably in a shaft line direction and a movable sheave 36b having the conical surface supported movably in the shaft line direction that are to hold the variable speed belt 35 between the conical surfaces. Similarly, the driven side speed-changing pulley 34 has conical surfaces facing to each other, and has a fixed sheave 37a fixed to the pulley shaft 32 immovably in a shaft line direction and a movable sheave 37b having the conical surface supported movably in the shaft line direction that are to hold the variable speed belt 35 between the conical surfaces. The fixed sheave 36a of the driving side speed-changing pulley 33 and the fixed sheave 37a of the driven side speed-changing pulley 34 are arranged so as to face each other through the variable speed belt 35 in a shaft line direction.

In such a belt-type continuously variable transmission, the distance between the conical surfaces of the sheaves 36a and 36b is increased by moving the conical surface of the movable sheave 36b backward at the driving side speed-changing pulley 33 side, and the distance between the conical surfaces of the sheaves 37a and 37b is decreased by moving the conical surface of the movable sheave 37b forward at the driven side speed-changing pulley 34 side. By this, a width of a belt holding space is adjusted, a pitch circle radius at the driving side speed-changing pulley 33 side is decreased, and a pitch circle radium at the driven side speed-changing pulley 34 side is increased, thereby power transmission having a pulley ratio larger than 1 is performed.

On the contrary to this, the distance between the conical surfaces is decreased at the driving side speed-changing pulley 33 side and the distance between the conical surfaces is increased at the driven side speed-changing pulley side 34, thereby the width of the belt holding space defined between those conical surfaces is adjusted. The pitch circle radium at the driving side speed-changing pulley 33 side is increased, and the pitch circle radium at the driven side speed-changing pulley 34 side is decreased, thereby power transmission having a pulley ratio smaller than 1 is performed.

Due to the speed-changing operation, even though misalignment is prevented by adjusting the positions of the belt holding spaces in a shaft line direction at a specific pulley ratio, misalignment (C) inevitably occurs at a position of other pulley ratio. In this case, by lateral pressure of the movable sheave 36b in the driving side speed-changing pulley 33, the belt side surface at the side contacting this receives large compressive force.

That is, when misalignment (C) is defined as the distance in a shaft direction between a center position between sheave surfaces of the fixed sheave 36a and movable sheave 36b of the driving side speed-changing pulley 33 and a center position between sheave surfaces of the fixed sheave 37a and movable sheave 37b of the driven side speed-changing pulley 34, and an inter-axial distance (L) is defined as the axial distance between the center lines of the parallel two pulley shafts 31 and 32, the amount of misalignment (angle θ) is obtained by tan θ=C/L. The angle θ is a maximum of 1.0° (e.g., from 0.1 to) 1.0°.

EXAMPLES

The present invention is described below in more detail based on Examples, but it should be understood that the invention is not limited by those Examples. Measurement method and evaluation method in each property, and raw materials used in Examples are described below. Unless otherwise indicated, "parts" and "%" are mass basis.

[Bending Stress when Strain in Rubber Sheet Thickness Direction is 10%]

Figure 4:
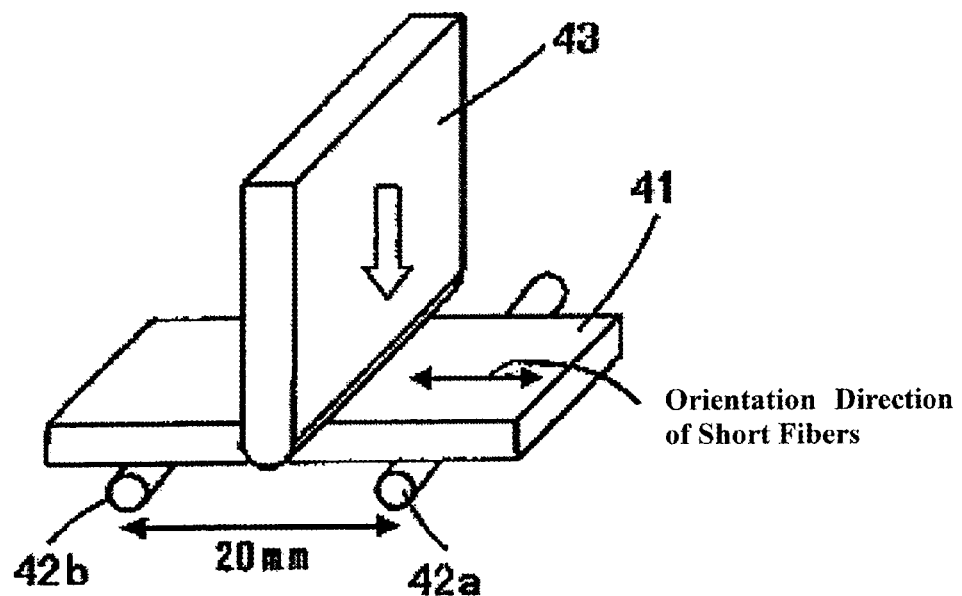
FIG. 4 is a schematically perspective view for explaining a measurement method of bending stress when strain in a thickness direction is 10%.

Unvulcanized rubber sheet for a compression rubber layer was press vulcanized at a temperature of 160° C. for 20 minutes to prepare a vulcanized rubber molding (length: 60 mm, width: 25 mm, and thickness: 6.5 mm) Short fibers were made to orient in a parallel direction (corresponding to a belt width direction) to a length of the vulcanized rubber molding. As illustrated in FIG. 4, the vulcanized rubber molding 41 was placed and held on a pair of rotatable rolls (6 mm diameter) 42a and 42b spacing a distance of 20 mm, and a metal pressing member 43 was placed on a central part of the upper surface of the vulcanized rubber molding in a direction vertical to an orientation direction of the short fibers. The tip of the pressing member 43 has a semi-circular shape having a diameter of 10 mm, and the vulcanized rubber molding 41 can be smoothly pressed by the tip. Furthermore, when pressing, frictional force acts between the lower surface of the vulcanized rubber molding 41 and the rolls 42a and 42b with compression deformation of the vulcanized rubber molding. However, influence of friction is decreased since the rolls 42a and 43b are rotatable. The state that the tip of the pressing member 43 is in contact with the upper surface of the vulcanized rubber molding 41 and pressing is not conducted is defined as "0", the upper surface of the vulcanized rubber molding 41 is pressed by lowering the pressing member 43 in a rate of 100 mm/min from this state, and stress when strain in a thickness direction of the vulcanized rubber molding 41 reached 10% was measured as bending stress.

[Strain when Belt is Compressed in Width Direction Under Stress of 2.0 N/mm$^2$]

Figure 5:
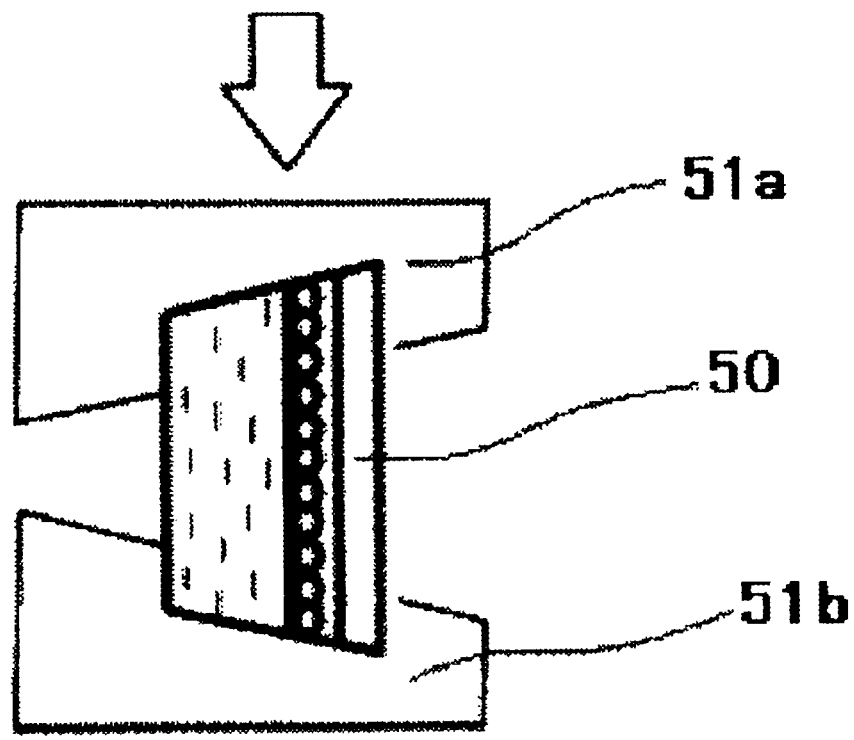
FIG. 5 is a schematic perspective view for explaining a measurement method of strain when a belt was compressed in a width direction.

Belt sample 50 obtained by cutting a trial power transmission belt into a length of 10 mm is vertically sandwiched between two metal jigs 51a and 52b such that belt side surfaces are in contact with those jigs 51a and 51b, as illustrated in FIG. 5. In this case, the position of the upper jig 51a is defined as an initial position in the sandwiched state that the belt sample 50 is not pressed by the jigs. The upper jig 51a was pressed to the belt sample 50 in a rate of 10 mm/min by using autograph to distort the belt sample 50 1%, followed by maintaining this state for 1 second, and the upper jig 51a was returned to the upper initial position (pre-compression). This pre-compression was repeated three times, and strain when the belt sample 50 was compressed in a width direction under a stress of 2.0 N/mm$^2$ was obtained from a stress-strain curve measured by fourth compression test (the conditions are the same as in the pre-compression).

[Strain when Belt is Pulled in Length Direction Under Load of 2 kN]

Belt sample was placed between chucks of 250 mm by using a tensile tester ("AUTOGRAPH AG-5000A" manufactured by Shimadzu Corporation), tensile test was conducted at ordinary temperature in a tensile rate of 50 mm/min, elongation at 2 kN was measured, and elongation (strain) was obtained.

[Pop-Out Life]

The trial belt was hung across two-shaft speed-changing tester including a drive pulley (pulley diameter: 90 mm) consisting of a fixed sheave and a movable sheave, and a driven pulley (pulley diameter: 190 mm) similarly consisting of a fixed sheave and a movable sheave, a load of 1.5 kN was applied to the driven pulley, and the belt was traveled in the state of setting the rotation of the drive pulley to 6,000 rpm and applying a load of 55 Nm as drive torque. The ambient temperature was 110° C. In this case, misalignment of 1.0° was set between the drive pulley and the driven pulley. After traveling, the time when pop-out occurred was measured.

[Raw Materials]
[Short Fiber]

Aramid short fiber (Twaron): "TWARON" manufactured by Teijin Limited, cut yarn, average fiber length: 3 mm, average fiber diameter: 12 μm Aramid short fiber (Technora): "TECHNORA" manufactured by Teijin Limited, cut yarn, average fiber length: 3 mm, average fiber diameter: 12 μm PBO (polyparaphenylene benzobisoxazole) fiber: "ZYLON" manufactured by Toyo Boseki Co., Ltd., cut yarn, average fiber length: 3 mm, average fiber diameter: 12 μm The short fiber used was a short fiber having an adhesion ratio of solid contents of 6 mass % obtained by being subjected to an adhesion treatment with an RFL liquid (containing resorcin, formaldehyde, and vinylpyridine-styrene-butadiene rubber latex as a latex). The RFL liquid used was a liquid containing resorcin: 2.6 parts by mass, 37% formalin: 1.4 parts by mass, vinylpyridine-styrene-butadiene copolymer latex (manufactured by Zeon Corporation): 17.2 parts by mass, and water: 78.8 parts by mass.

(Other Additives)

Ether ester oil: "RS700" manufactured by ADEKA
Carbon black: "SEAST 3" manufactured by Tokai Carbon Co., Ltd.
Age resister: "NONFLEX OD3" manufactured by Seiko Chemical Co., Ltd.
Silica: "Nipsil VN3" manufactured by Tosoh Silica Corporation
Vulcanization accelerator: Tetramethylthiuram.disulfide (TMTD)

(Tension Member 1)

Two bundles (called aramid fiber single yarns) of untwisted aramid fiber filaments uniformly arranged in a ribbon shape consisting of aramid fibers ("TECHNORA (registered trademark)" manufactured by Teijin Limited) of 1,670 dtex (the number of filament: 1,000) were first twisted (Z-twisted) in the number of first twisting of 3.7 turns/10 cm, and three yarns thus first twisted were bundled and final twisted (Z-twisted) in the same direction as in the first twisting in the number of the final twisting of 13.1 turns/10 cm to form a twisting structure of 2×3. Thus, an untreated cord of a total denier of 10,020 was prepared. The untreated cord was pre-dipped in a treatment liquid obtained by mixing an urethane prepolymer ("MILLIONATE MR-200" manufactured by Nippon Polyurethane Industry Co., Ltd.) with toluene followed by stirring at room temperature for 10 minutes, and then dried at from about 170 to 180° C., dipped in an RFL liquid, and subjected to a stretching thermofixing treatment at from 200 to 240° C. to prepare a treated cord.

(Tension Member 2)

Two bundles (called aramid fiber single yarns) of untwisted aramid fiber filaments uniformly arranged in a ribbon shape consisting of aramid fibers ("TWARON (registered trademark)" manufactured by Teijin Limited, standard modulus type) of 1,670 dtex (the number of filament: 1,000) were first twisted (Z-twisted) in the number of first twisting of 15.8 turns/10 cm, and three yarns thus first twisted were bundled and final twisted (Z-twisted) in the same direction as in the first twisting in the number of the final twisting of 19.7 turns/10 cm to form a twisting structure of 2×3. Thus, an untreated cord of a total denier of 10,020 was prepared. The untreated cord was pre-dipped in a treatment liquid obtained by mixing an urethane prepolymer ("MILLIONATE MR-200" manufactured by Nippon Polyurethane Industry Co., Ltd.) with toluene followed by stirring at room temperature for 10 minutes, and then dried at from about 170 to 180° C., dipped in an RFL liquid, and subjected to a stretching thermofixing treatment at from 200 to 240° C. to prepare a treated cord.

Examples 1 to 5 and Comparative Examples 1 to 2

Formation of Rubber Layer

The rubber compositions of Table 1 (compression rubber layer and tension rubber layer) and Table 2 (tension member-supporting layer) were subjected to rubber kneading by using the conventional method such as Banbury mixer, respectively, and the kneaded rubbers were passed through calendar rolls to prepare rolled rubber sheets (a sheet for a compression rubber layer, a sheet for a tension rubber sheet and a sheet for a tension member-supporting layer).

TABLE 1

| Blending No. (parts) | Blending Example | | | | | |
|---|---|---|---|---|---|---|
| | Blend 1 | Blend 2 | Blend 3 | Blend 4 | Blend 5 | Blend 6 |
| Chloroprene rubber | 100 | 100 | 100 | 100 | 100 | 100 |
| Aramid short fiber (TWARON) | 25 | 25 | 0 | 0 | 0 | 0 |
| Aramid short fiber (TECHNORA) | 0 | 0 | 25 | 25 | 25 | 0 |
| PBO fiber | 0 | 0 | 0 | 0 | 0 | 25 |
| Ether ester oil | 5 | 5 | 5 | 5 | 5 | 5 |
| Magnesium oxide | 4 | 4 | 4 | 4 | 4 | 4 |
| Carbon black | 30 | 30 | 30 | 30 | 30 | 30 |
| Age resister | 4 | 4 | 4 | 4 | 4 | 4 |
| Zinc oxide | 5 | 5 | 5 | 5 | 5 | 5 |
| N,N'-m-phenylenedimaleimide | 8 | 2 | 8 | 4 | 2 | 2 |
| Sulfur | 0.5 | 0.5 | 0.5 | 0.5 | 0.5 | 0.5 |
| Bending stress at 10% strain in rubber sheet thickness direction (MPa) | 5.9 | 5.1 | 5.0 | 4.4 | 3.6 | 3.4 |

TABLE 2

| | |
|---|---|
| Chloroprene rubber | 100 |
| Ether ester oil | 5 |
| Magnesium oxide | 4 |
| Silica | 20 |
| Carbon black | 30 |
| Resorcin•formalin copolymer | 1.5 |
| Age resister | 4 |
| Zinc oxide | 5 |
| Vulcanization accelerator TMTD | 1 |
| N,N'-m-phenylenedimaleimide | 5 |
| Stearic acid | 2 |
| Hexamethoxymethylol melamine | 3.5 |

[Production of Power Transmission Belt]

On the surface of a vulcanized rubber-made inner mother mold with cog shape mounted on a mold were previously wound to joint a reinforcing fabric (mixed canvas of polyester fibers and aramid fibers) having a given thickness and a sheet-shaped cog pad obtained by embossing cog portions on a sheet for a compression rubber layer having short fibers oriented in a width direction, and thereon were sequentially wound a rubber sheet for a lower tension member-supporting layer, a tension member, a rubber sheet for a upper tension member-supporting layer, and a flat tension rubber layer, to thereby prepare a molding. Subsequently, on the surface of the molding was covered a vulcanized rubber-made outer mother mold with a cog shape and a jacket, and the mold was placed in a vulcanization can, followed by vulcanization at a temperature of 160° C. for a period of 40 minutes under 0.9 MPa to obtain a belt sleeve. As for the vulcanization conditions, selected was the conditions similar to the vulcanization of the unvulcanized rubber sheet for a tension member-supporting layer, sheet for a compression rubber layer and sheet for a tension rubber layer. This sleeve was cut into a V-shape by a cutter to finish into a variable speed belt. That is, a double cogged V-belt having the structure illustrated in FIG. 2 was prepared. In detail, prepared was a raw edge cogged V-belt having the compression rubber layer 13 and the tension rubber layer 14 formed on both surfaces of the tension member-supporting layer 11 having the tension member 12 embedded therein, respectively, in which the cog portions 16 and 17 are formed on both the compression rubber layer 13 and the tension rubber layer 14, respectively, and the reinforcing fabric are provided on the surfaces of the tension rubber layer 14 and the compression rubber layer 13 (sizes: upper width 37.1 mm, thickness 16.7 mm, outer circumferential length 1,188 mm, height of the cog portion 16 of the compression rubber layer 6.8 mm, pitch thereof 10.5 mm, height of the cog portion 17 of the tension rubber layer 3.8 mm, and pitch thereof 9.9 mm)

Evaluation results of the belts obtained in Examples and Comparative Examples are shown in Table 3.

As a result, (1) the strain when the belt was compressed in a width direction under a stress of 2.0 N/mm$^2$ in Examples 1 to 5 is equal to or larger than Comparative Example 1, and (2) the strain when the belt was pulled in a length direction under a load of 2 kN in Examples 1 to 5 is large as compared with Comparative Example 1. It is understood from this that pop-out life in misalignment setting is improved.

This indicates that when (1) the strain when the belt is compressed in a width direction under a stress of 2.0 N/mm$^2$ is set so as to be equal to or larger than Comparative Example 1 and (2) the strain when the belt is pulled in a length direction under a load of 2 kN is set so as to be large as compared with Comparative Example 1, thereby making it easy to deform by compression in a belt width direction and making it easy to elongate in a lengthwise direction of a belt, the belt can absorb stress in the belt width direction and in the lengthwise direction of a belt, generated when changing speed, and can responds to misalignment. By this, it is thought that the traveling time until pop-out phenomenon that tension member jumps out of the belt body occurs was prolonged and a belt life was improved.

In Comparative Example 2, (1) the strain when the belt was compressed in a width direction under a stress of 2.0 N/mm$^2$ and (2) the strain when the belt was pulled in a length direction under a load of 2 kN are large as compared with Examples 1 to 5, the belt is easy to deform by compression in a belt width direction and is also easy to stretch in a belt lengthwise direction, and as a result, the pop-out life is improved as compared with Comparative Example 1, but is decreased as compared with Examples 1 to 5. In more detail, in the belt of Comparative Example 2, aramid short fibers are not contained in the rubber composition constituting the compression rubber layer, and the strain when compressed in a belt width direction under a stress of 2.0 N/mm$^2$ is large as 0.9%. Therefore, it is thought that internal strain is increased in the interface between the tension member and the tension member-supporting layer, peeling of the tension member is easy to occur, and pop-out is easy to occur in a short traveling time.

Although the present invention has been described in detail and by reference to the specific embodiments, it is apparent to one skilled in the art that various modifications or changes can be made without departing the spirit and scope of the present invention.

This application is based on Japanese Patent Application No. 2013-069107 filed on Mar. 28, 2013 and Japanese Patent Application No. 2014-059999 filed Mar. 24, 2014, the disclosures of which are incorporated herein by reference.

TABLE 3

| | Examples | | | | | Comparative Example | |
| --- | --- | --- | --- | --- | --- | --- | --- |
| | 1 | 2 | 3 | 4 | 5 | 1 | 2 |
| Rubber blending | Blend 3 | Blend 4 | Blend 5 | Blend 1 | Blend 2 | Blend 3 | Blend 6 |
| Tension member | Tension member 2 TWARON | Tension member 2 TWARON | Tension member 2 TWARON | Tension member 2 TWARON | Tension member 2 TWARON | Tension member 1 TECHNORA | Tension member 2 TWARON |
| Strain when belt was compressed under stress of 2.0 N/mm$^2$ in width direction (%) | 0.5 | 0.6 | 0.7 | 0.6 | 0.8 | 0.5 | 0.9 |
| Strain when belt was pulled under load of 2 kN in length direction (%) | 0.54 | 0.55 | 0.57 | 0.64 | 0.68 | 0.34 | 0.70 |
| Pop-out life (hr) | 25 | 32 | 32 | 37 | 29 | 9 | 14 |

INDUSTRIAL APPLICABILITY

The power transmission belt of the present invention can be used in a cogged V-belt having a V-shaped cross-section and having a plurality of convex portions (cog portions) at given intervals provided on the inner circumferential side (compression rubber layer) of the belt, and in a double cogged V-belt having a V-shaped cross-section and having a plurality of convex portions (cog portions) provided on both the inner circumferential side and the outer circumferential side (tension rubber layer) of the belt. Particularly, it is preferred to apply to a belt (a variable speed belt) used in a power transmission in which speed change ratio is continuously changed during traveling the belt, for example, a stepless variable speed change belt in motorcycles, ATV (four-wheeled buggy), snowmobiles and the like.

DESCRIPTION OF REFERENCE NUMERALS AND SIGNS

1: Tension member-supporting layer
2: Tension member
3: Compression rubber layer
4: Tension rubber layer
5: Reinforcing fabric
6: Cog portion

The invention claimed is:

1. A power transmission belt provided with a tension member extending in a lengthwise direction of a belt, a tension member-supporting layer in contact with at least a part of the tension member, a tension rubber layer formed on one surface of the tension member-supporting layer, and a compression rubber layer formed on the other surface of the tension member-supporting layer, the belt having a plurality of cog portions formed on an inner circumferential surface of the compression rubber layer along the lengthwise direction of the belt at a prescribed interval, and the belt frictionally engaging with a pulley on a side surface of the compression rubber layer, wherein the tension member is formed of an aramid fiber, the compression rubber layer is formed of a vulcanized rubber composition, the vulcanized rubber composition comprising:
    a rubber component,
    aramid short fibers in a proportion of from 20 to 30 parts by mass per 100 parts by mass of the rubber component, and
    carbon black, the aramid short fibers are embedded in the vulcanized rubber composition and oriented in a width direction of the belt, the power transmission belt has a strain of from 0.5 to 0.8% when compressed under a stress of 2.0 N/mm$^2$ in the width direction, the power transmission belt has a strain of from 0.35 to 0.7% when pulled under a load of 2 kN in the lengthwise direction, and wherein the vulcanized rubber composition is characterized by a bending stress when a strain in a thickness direction reached 10%, of from 3.5 to 6.0 MPa, when performing press vulcanization at a temperature of 160° C. under a pressure of 2.0 MPa for 20 minutes.

2. The power transmission belt according to claim 1, wherein the aramid fiber of the tension member is a polyparaphenylene terephthalamide fiber.

3. The power transmission belt according to claim 1, wherein the rubber component of the compression rubber layer is chloroprene rubber, and the vulcanized rubber composition of the compression rubber layer further comprises bismaleimide.

4. The power transmission belt according to claim 3, wherein the bismaleimide has a proportion of from 1 to 15 parts by mass per 100 parts by mass of the rubber component.

5. The power transmission belt according to claim 1, used in a continuously variable transmission.

6. A belt-type continuously variable transmission comprising:
    a continuously variable transmission containing two pulley parts each having a rotating shaft, a fixed sheave and a movable sheave; and
    a power transmission belt,
    wherein the rotating shafts of the two pulley parts are arranged in parallel with each other, the fixed sheave is mounted on each rotating shaft so as to be integrally rotatable with the rotating shaft, the movable sheave is mounted so as to face the fixed sheave, form a V-shaped groove shape and be movable in a shaft direction of the rotating shaft, and
    the power transmission belt is hung across the sheaves of the two pulley parts, and
    wherein the power transmission belt is the power transmission belt according to claim 1.

7. The power transmission belt according to claim 3, wherein the bismaleimide has a proportion of from 2 to 8 parts by mass per 100 parts by mass of the rubber component.

* * * * *